Feb. 7, 1939. C. D. HAZEN 2,146,430
WELDING APPARATUS
Filed Aug. 12, 1930 7 Sheets-Sheet 4
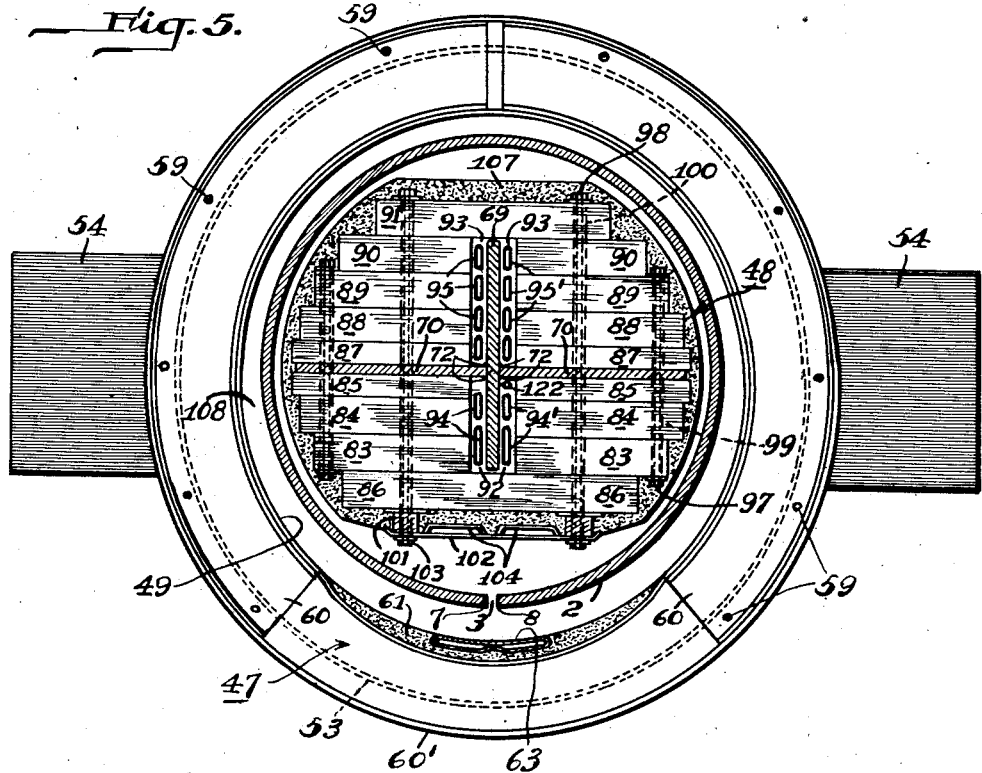
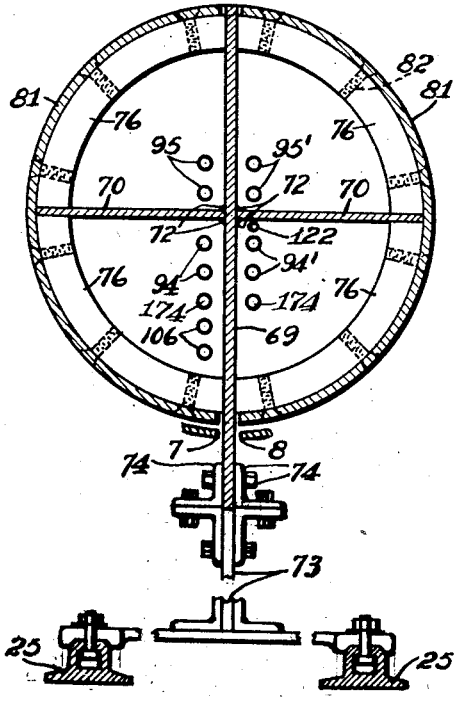
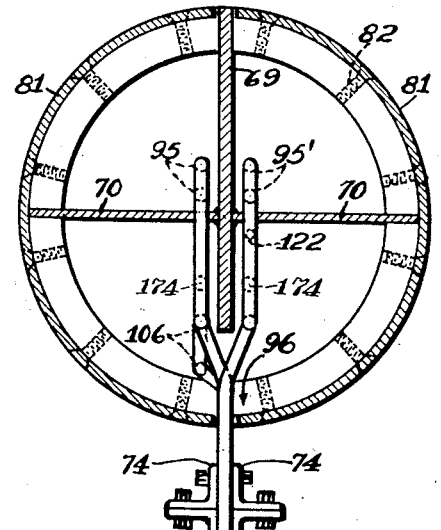
INVENTOR
Comer D. Hazen
per.
Green & McCallister
Attorneys.

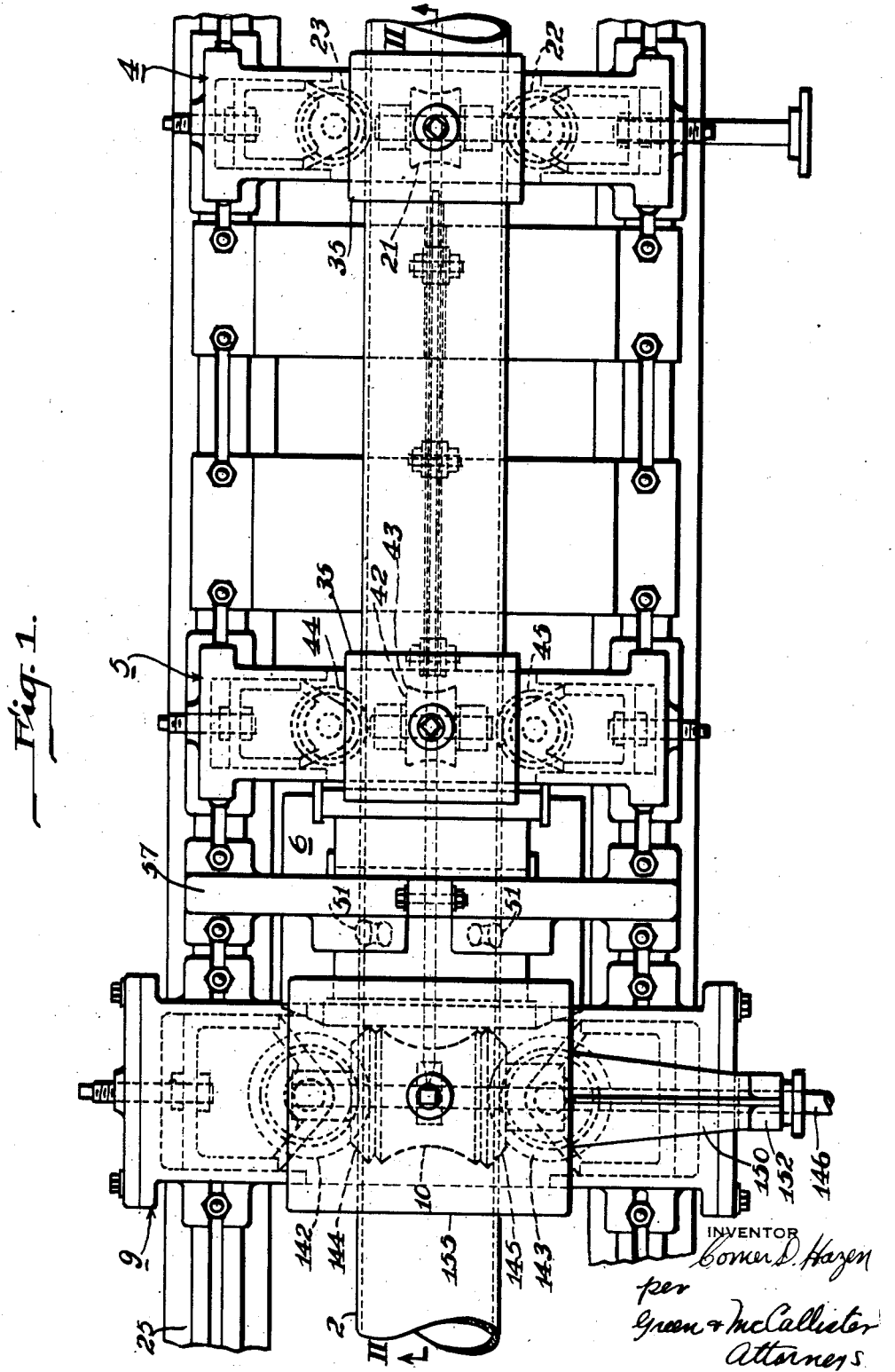

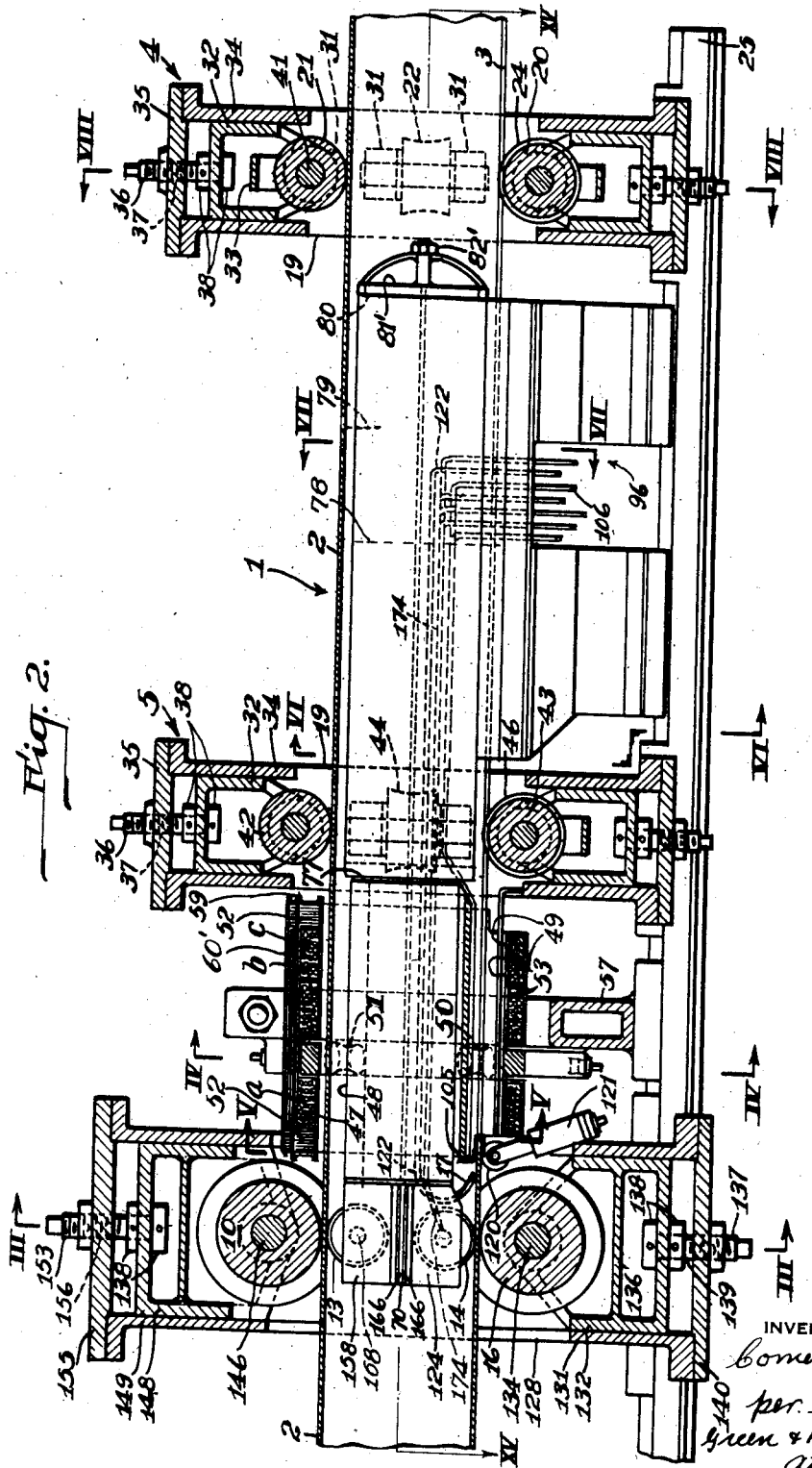

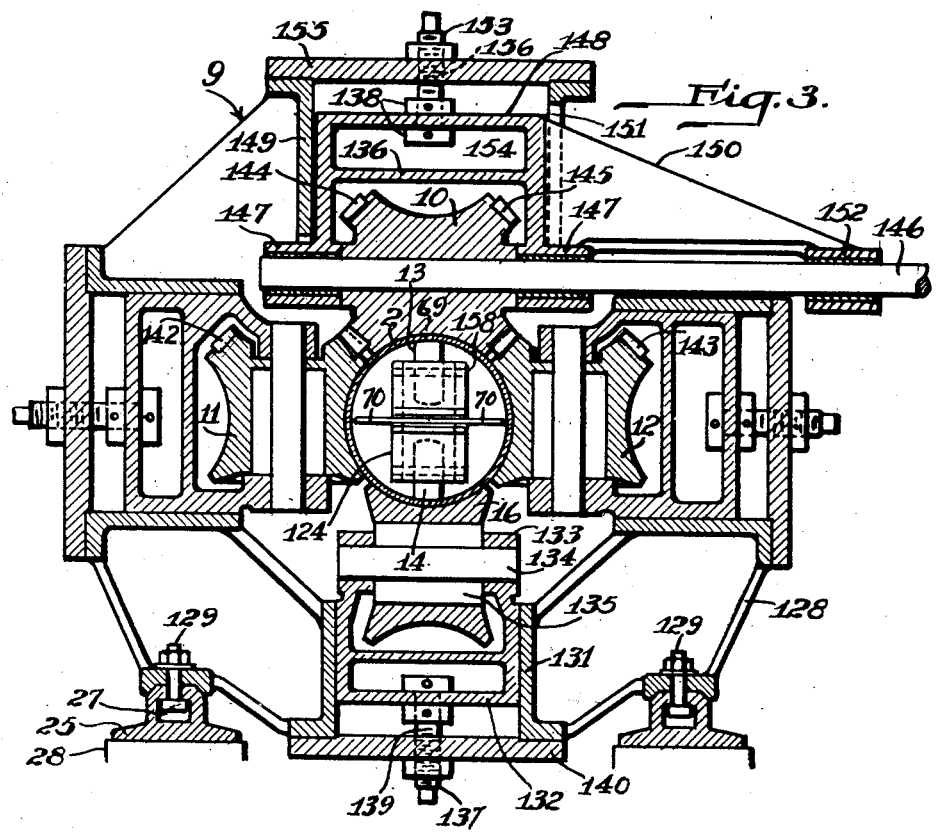
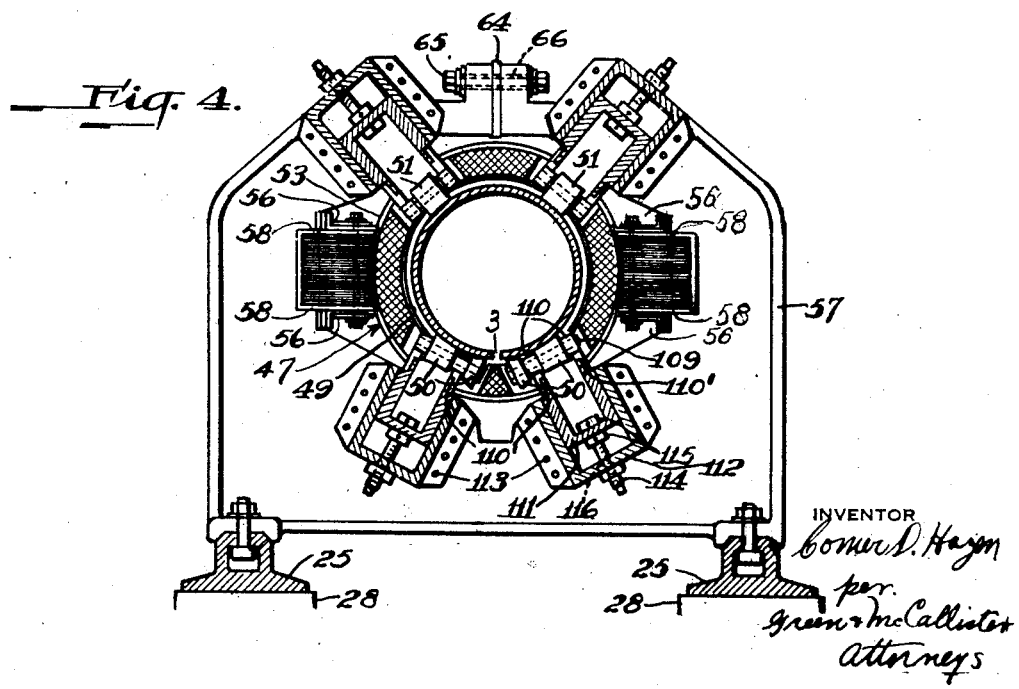

Feb. 7, 1939.                C. D. HAZEN                2,146,430
                          WELDING APPARATUS
                       Filed Aug. 12, 1930           7 Sheets-Sheet 5
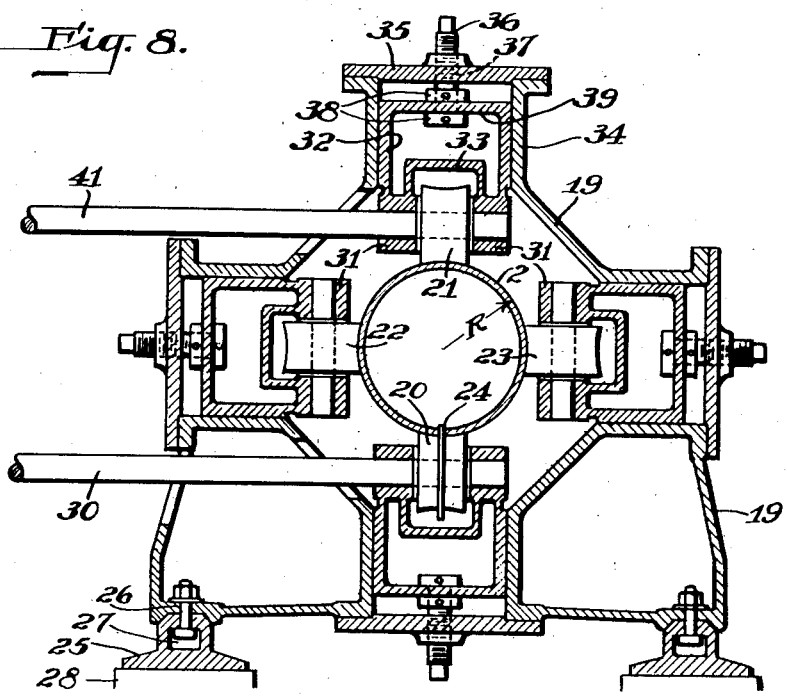
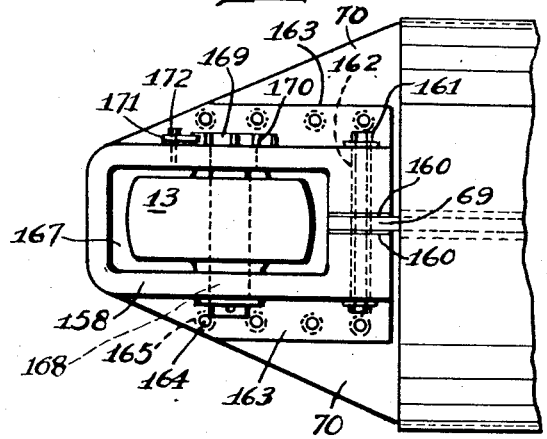
INVENTOR
Comer D. Hazen
per.
Green + McCallister
Attorneys Feb. 7, 1939.   C. D. HAZEN   2,146,430
WELDING APPARATUS
Filed Aug. 12, 1930   7 Sheets-Sheet 6
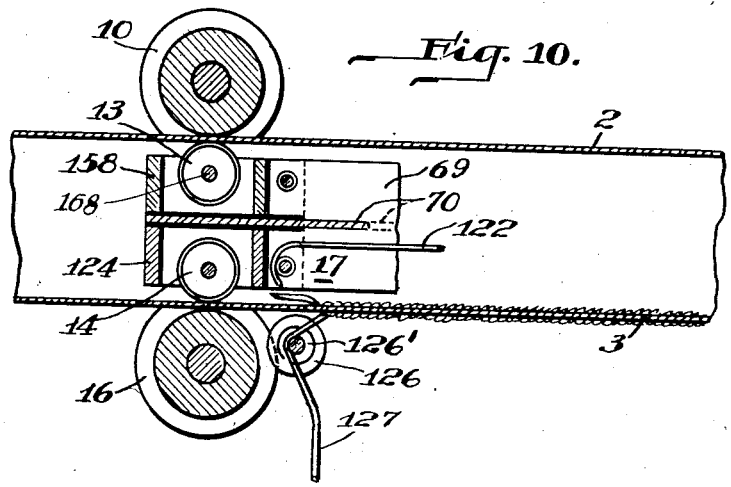
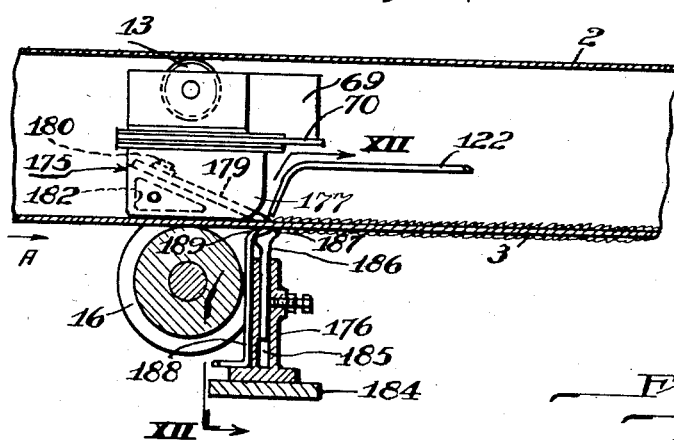
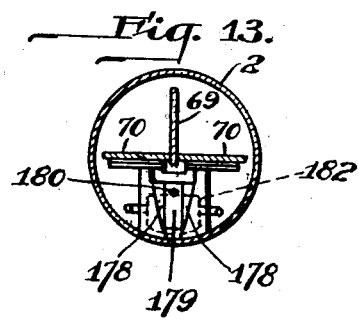
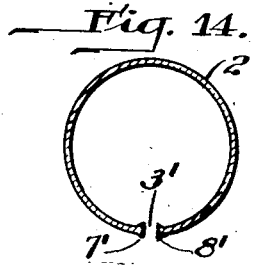
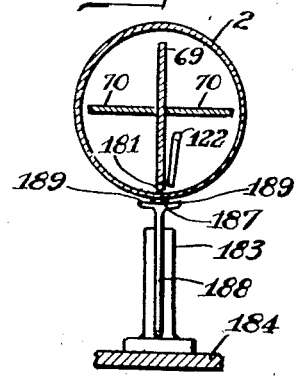
INVENTOR
Comer D. Hazen
per.
Green & McCallister
Attorneys

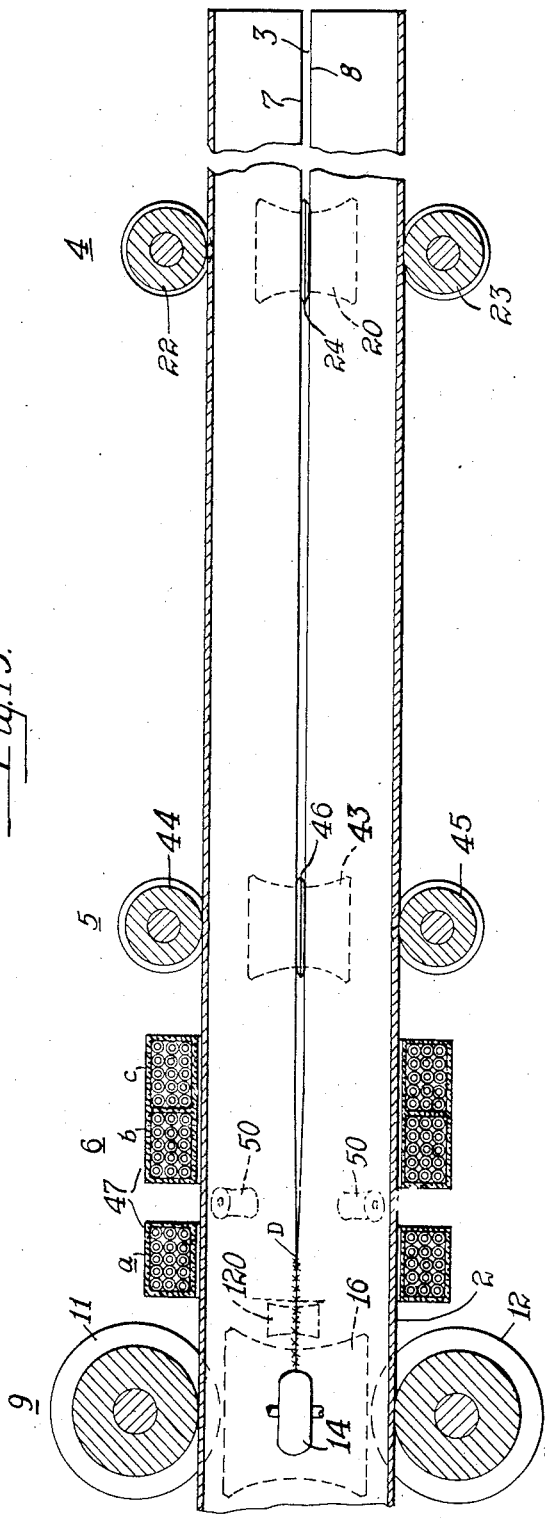

Patented Feb. 7, 1939

2,146,430

UNITED STATES PATENT OFFICE 2,146,430

WELDING APPARATUS

Comer D. Hazen, Youngstown, Ohio

Application August 12, 1930, Serial No. 474,702

23 Claims. (Cl. 219—6)

This invention relates to welding apparatus and more particularly to that class of apparatus in which the metal to be welded is heated to welding temperatures by electromagnetic induction.

An object of this invention is to provide a relatively simple, effective and efficient apparatus by means of which metallic bodies may be quickly, efficiently and economically welded.

Another object of the invention is the provision of apparatus whereby such objects as open seam pipe or tubing may be welded while moving or in motion.

A further object of the invention is to electrically heat metallic bodies to welding temperature at the region to be welded by a combination of resistance and arc heating.

A still further object of the invention is the provision of a simple, efficient and compact apparatus for welding metallic bodies that shall embody novel details of construction, arrangement and combination of parts.

Other objects of the invention will, in part, be apparent and will, in part, be obvious from the following description taken in conjunction with the accompanying drawings in which:

Figure 1 is a top plan view of a machine or apparatus arranged and constructed in accordance with an embodiment of the invention;

Fig. 2 is a view in section of the machine or apparatus shown in Fig. 1 taken on line II—II thereof;

Figs. 3 to 8, inclusive, are views in transverse section taken on lines III—III to VIII—VIII, respectively of Fig. 2;

Fig. 9 is a fragmentary top plan view of a detail embodied in the machine or apparatus shown in Figs. 1 and 2;

Fig. 10 is a fragmentary view in longitudinal vertical section of the welding rollstand illustrating means, mechanism or instrumentalities for trimming the fused seam of a pipe, to be welded, of expelled metal before the fused seam passes through welding rolls;

Fig. 11 is a view similar to Fig. 10, illustrating a modified form of seam trimming mechanism and welding apparatus;

Fig. 12 is a partial view in section taken on line XII—XII of Fig. 11;

Fig. 13 is an end view looking in the direction of arrow A of a welding shoe and trimming tool illustrated in Fig. 11;

Fig. 14 is a view in transverse section of a pipe to be welded in which the seam edges are upset or enlarged; and Fig. 15 is a view in horizontal section of the machine taken on line XV—XV of Fig. 2, in which many of the details of the apparatus have been eliminated in order to show more clearly the manner in which the open seam of the pipe is closed and heated as the pipe is fed through the machine.

Throughout the drawings and the specification like reference characters indicate like parts.

In Figs. 1 and 2 of the drawings, an assembled machine or apparatus designated in its entirety by the reference character 1, is shown arranged and constructed in accordance with an embodiment of the invention. The machine illustrated is arranged and designed to weld metallic objects or bodies, such as, open seam tubing or pipe 2, while the pipe or tubing is moving through the machine.

The open seam tubing, such as illustrated by pipe 2 is of the type employed in long gas distribution pipe lines; in water lines and etc. Such piping is usually made from steel and ranges in diameter from 6 to 20 or more inches and the thickness of the walls of such tube or piping varies according to the internal pressure the pipe must sustain.

The piping 2 is ordinarily formed from steel plates of predetermined lengths, widths and thicknesses that are rolled or shaped so as to provide a tube or pipe having a substantially circular transverse section. When so rolled or shaped the meeting edges are slightly spaced apart so that before welding, the seam is open as indicated at 3, Fig. 4. This seam will be hereafter referred to as an open seam.

Where the machine is employed to weld socalled open seam pipe or tubing, the pipe or tubing is so positioned that the seam 3 is down or on the underside of the pipe as shown in Figs. 1, 2, 4, 8 and 14. The welding operation is a continuous process and takes place as the pipe or tubing is being moved or fed through the machine.

The pipe or tubing 2 enters the machine through the rollstand 4 at which stand the pipe or tubing is operated upon by power driven rollers that pull the pipe along the machine and force it through a rollstand 5 provided with idle rollers concentrically disposed about the longitudinal center line of the tube or pipe. The pipe on leaving or emerging from the rollstand 5 passes into and through a heating station 6 within which an alternating current voltage is developed in that portion of the pipe within the station 6 by electromagnetic induction.

The pipe or tubing after it enters the heating station 6 and also before entering station 9 is so manipulated that the edges 7 and 8 of the open seam 3 are forced together at a predetermined point so that the edges are heated to welding temperature at the point of contact of the edges, or at the point where the seam is closed, by a combination of arc and resistance heating as will be more fully set forth in detail in subsequent sections of this specification.

As the pipe or tubing 2 leaves the heating station 6 it enters a rollstand 9 having external power driven rollers 10, 11 and 12 arranged to operate upon the pipe at its top and sides, respectively. These rollers operate to pull the pipe through the machine and in this respect aid the power driven rollstand 4 which operates also to pull the pipe into and through the machine.

Rollstand 9 includes idle internal rolls 13 and 14 that operate within the pipe 2 and an external roller 16 located on the underside of the pipe. The internal rolls 13 and 14, as will subsequently be disclosed, are not supported by the rollstand 9, but are mounted in housings attached to a core structure embodied in the heating station 6. The seam 3 of the pipe, which has been heated to welding temperature, passes between the rolls 14 and 16. These rolls are so disposed that they squeeze and roll the heated seam and cause the edges of the pipe to be united and firmly welded together. Since the rolls 14 and 16 are idle rolls, no stresses or strains are set up in the welded seams, such as would be occasioned if these rolls were power driven; therefore, a strong efficient weld is obtained.

It will also be understood that the welding rolls 14 and 16 may be so formed and shaped that any predetermined shape or form of bead at the welded seam may be obtained.

It will be understood that where metal is being heated to welding temperature, it becomes semi-molten or plastic and piles up or accumulates at the region heated to such temperature. This accumulation of metal includes scale and oxides. In order to form a smooth welded seam on the inside of the pipe, it is desirable to remove all, or a portion at least, of such accumulated excess metal, scale and oxide before the pipe or tubing passes through the welding rolls 14 and 16. Such excess metal, scale and oxide may be removed by a tool or instrumentality indicated generally at 17 which operates upon the seam 3 from the inside of the pipe. The tool or instrumentality 17 in order to accomplish its purpose is placed in front of the inside welding roll 14 so that the excess metal and scale may be removed before the heated seam passes through the welding rolls.

The excess metal, scale and/or oxide may be scavenged after its removal by directing an air blast against it so as to blow it away from the welding rolls. The air blast so employed may also be utilized to cool the tool or instrumentality 17. The nature and construction of the tool or instrumentality 17 is disclosed in Figures 10 to 13, inclusive, and will be described in detail in connection with the description and operation of the rollstand 9.

Rollstand 4

Rollstand 4 comprises a frame 19, top and bottom power driven rolls 20 and 21 and idle side rolls 22 and 23. In order to keep the seam 3 of the pipe open as it enters the machine, the bottom roll 20 is provided with a circumferential fin 24 that operates between the adjacent edges of the pipe which form the open seam 3. These rolls, as shown, are mounted 90° apart and are hollowed out on the arc of a circle, the radius of which is determined by the size of tube or pipe to be welded. In any case, the radius of curvature will be substantially equal to the radius R of the outer circular surface of the pipe 2. By providing the rolls with such a surface, each roll will have a relatively large area of contact with the pipe 2 as it passes through them.

The frame 19 may be mounted on bedplates 25 and secured thereto by bolts 26 having square heads located in T-slots 27 formed in the bedplates. The bedplates 25 may be mounted on and secured to suitable foundations 28.

The bottom power driven roll 20 is mounted on and secured to a shaft 30 journalled in bearings 31 which are formed as an integral part of a boxlike housing 32. Bearings 31 may be stiffened and braced by means of a U-shaped strut 33 attached to the bearings and spanning the roll 20.

The housing 32 is slidably disposed within a boxlike sleeve 34 formed in the underside of the frame 19. In order that the roll 20 may be adjustably raised and lowered, a cap plate 35 secured to the frame 19 over the entrance to the sleeve 34, and a roll adjusting screw 36 are provided. The adjusting screw has screw thread engagement with the plate 35, as at 37, and the upper end of this screw is stationarily but rotatably attached to the sleeve 32 by means of blocks 38 pinned to the screw. These blocks are located one on each side of a wall 39 forming an integral part of the sleeve 32. As the screw 36 is turned into and out of the sleeve 34, the roll 20 may be raised and lowered to the desired position.

The side rolls 22 and 23 may be mounted on suitable stub shafts journalled in bearings 31 formed as an integral part of a bearing housing 32 similar to the one described in connection with bottom roll 20. The bearing housings which carry the side rollers 22 and 23 are substantially identical in construction with the bearing housing 32, are mounted in boxlike sleeves 34 and are adjustable in and out by means of screws 36, as described in connection with housing 32 which carries the bottom roll 20. For this reason similar reference characters as applied to the side rolls 22 and 23, the bearing housings and the boxlike sleeves formed in the frame or yoke 19 may be understood to be like and similar to the elements described in the description of the bottom roll 20, its bearing housing and housing sleeve.

The top power driven roll 21, as illustrated, is mounted on and secured to a power shaft 41 journalled in bearings 31 of a bearing housing 32. The bearing housing 32 is similar to the bearing housings 32 described in connection with the bearing housings for rolls 20, 22 and 23 and are adjustable in a vertical direction by means of a screw 36 having screw thread engagement with the cap plate 35.

In order that the rolls 20 and 21 may be driven at the same speed, but in opposite directions, the shafts 30 and 41 may be either mechanically connected, as by a suitable train of gears (not shown) or to individual motors (not shown).

Rollstand 5

Rollstand 5 is similar in construction to rollstand 4. However, it differs therefrom in this respect that it is provided with top and bottom idle rolls 42 and 43 and idle side rolls 44 and 45. The idle rolls embodied in rollstand 5 are identical in construction with the rolls of rollstand 4. The idle rolls of rollstand 5 are mounted on stub shafts journalled in bearings formed in bearing housings similar to those shown and described in connection with rollstand 4 and are designated by the same reference characters. In passing it is to be noted that the bottom roll 43 is provided with a circumferential fin 46 that operates in the open seam 3 and between the adjacent edges thereof so as to keep the seam open as the pipe enters the heating station 6.

*Heating station 6*

The heating station 6 comprises an induction coil 47 which is asymmetrical to the axis of pipe 2, and wound from hollow copper tubing, or equivalent material, through which cooling fluid may be circulated to cool the coil, and a core 48. The coil 47, as illustrated, may be divided into sections a, b and c.

In the construction of the coil, hollow copper tubing or its equivalent is wound on a tube or cylinder 49 of insulating material, such as is known to the trade as Micarta, or its equivalent. The tube 49 may be extended downwardly at the bottom so that it is slightly egg shape in section (see Fig. 5) in order to provide more clearance between the pipe 2 and the bottom of the coil 47 than between the top of the pipe and the upper part of the coil. Coil 47 is therefore asymmetrical on opposite sides of a plane containing the longitudinal axis of the material being welded and substantially normal to a plane containing such axis and passing between the edges of the material.

Coil sections a and b of coil 47 are spaced apart sufficiently to provide a space in which seam adjusting rolls 50 and 51 may be placed. These rolls, as will be more clearly set forth hereafter, operate to squeeze or force the edges 7 and 8 of the pipe seam 3 together at a predetermined point near to the outgoing end of the heating station, at which point the current induced in the pipe flows across the seam edges so that they may weld or fuse before entering the welding rolls where the welding operation is completed.

The insulating tube 49 extends beyond coil sections a and c so as to provide a support for a plurality of laminations 52 of transformer iron placed at the opposite ends of the coil and also to shield these laminations from the pipe 2. The outer surface of the coil sections a, b and c may be covered with a tube 53 of insulating material such as comprises the tube 49. The end laminations 52 serve to limit and to confine the magnetic field developed by the coil 47 to a region confined or limited to the space between the rollstands 5 and 9. By the provision of these laminations, it will be apparent that only so much of the pipe seam 3 as is confined within the coil 47 will have an alternating current voltage developed therein. This voltage causes current to flow across the seam edges at the point where the seam adjusting rolls bring them into contact.

The end laminations 52 of transformer iron may be magnetically connected by packs 54 of transformer laminations disposed on each side of the coil 47. The packs 54 may be clamped between brackets 56 forming part of a support 57 which carries the coil, the transformer laminations and the seam adjusting rolls 50 and 51. The laminations 54 may be insulated from the brackets by strips 58 of insulation.

The end laminations 52 and the coil sections a, b and c may be firmly secured together in association with the packs 54 of transformer iron laminations and the coil 47 by means of insulated through bolts 59 and channel members 60. As shown in Fig. 5 the channel members 60 extend only part way around the ends of the coils and are spaced apart at the top so that eddy currents may be kept down to a low value. The exterior surface of coil 47 may be covered with a tube or cylinder 60′ of insulating material.

In order to protect the lowermost portion of the coil 47 and the tube 49 from hot particles of metal that may burn off and fall away from the seam 3 of the pipe, a layer 61 of heat resistant cement may be placed on the inside of the tube. This layer of cement may be cooled by means of a flattened tube or conduit 63 extending the full length of the coil and through which cooling fluid may be passed. By reason of such construction a greater heat removal is effected from that portion of the coil adjacent the line of weld than from other portions thereof adjacent the tubular material or pipe 2.

In order to prevent the flow of circulating electric currents in the support or frame 57, the support may be split at its top so as to accommodate a strip or block 64 of insulation. The split portion of the frame may be held rigidly together by a bolt 65 insulated from the support by a tube 66 of insulating material.

The core 48 comprises a vertical plate 69 and horizontal plates 70 disposed one on each side thereof (see Figs. 5, 6 and 7) and welded to the vertical plate as at 72. The plates 69 and 70 extend from a point adjacent to rollstand 4 to a point within rollstand 9. Vertical plate 69 may be secured to a support 73 by means of angle irons 74 which may be bolted or otherwise secured to the plate 69 and the support. Support 73 may be mounted on and secured to the bedplates 25 as shown in Figs. 2 and 6. Plates 69 and 70 when so constructed and mounted on support 73 constitute what may be called a cantilever beam for supporting the core and the internal rolls 13 and 14 of rollstand 9.

Plates 69 and 70 have segmental castings 76 secured thereto (see Fig. 6) that extend from a point 77 in rollstand 5 to a point 78 between rollstands 4 and 5 and from points 79 to 80 (see Fig. 2). The plates and segmental castings may be enclosed by half cylinders 81 secured to the castings by countersunk screws 82 (see Fig. 6). The half cylinders 81 function to protect the cooling conduits and to strengthen and rigidify the plates 69 and 70. The end of the cylinder formed by half-cylinders 81 may be closed by a cap or cover 81′ secured in place by a bolt 82′. While passing between or from rollstand 4 to rollstand 5 the adjacent edges 7 and 8 of the seam 3 are disposed one on each side of the vertical plate 69 as shown more particularly in Fig. 6 of the drawings, whereby turning of the pipe about its longitudinal axis is prevented.

The magnetic core proper of coil 47 comprises groups or packs 83, 84 and 85 of transformer iron laminations which are placed below the horizontal plates 70 and on each side of the vertical plate 69. Another group 86 of transformer iron laminations is placed below the group 85 in overlapping relation thereto. Similar groups 87, 88, 89, 90 and 91 are placed above the horizontal plates 70 and on each side of the vertical plates 69. As shown in Fig. 5 the groups or packs of laminations adjacent to the vertical plate are spaced therefrom so as to provide spaces 92 and 93 in which conduits 94—94' and 95—95' may be placed in heat exchanging relation to the laminations of the core. These conduits may be brought into the transformer core at 96 (see Figs. 2 and 7) at which point the conduits may be taken to a suitable source of supply of cooling fluid to be circulated through conduits for cooling the transformer laminations. As illustrated in Fig. 7, these tubes pass between the angle iron members 74, a portion of the vertical plate 69 being cut away at this point, tubes 95—95' being located above and on each side of plate 69 and tubes 94—94' being below and on each side of plate 69.

The packs of laminations shown in Fig. 5 may be firmly secured in place by means of through bolts 97 and 98 which are insulated from the laminations by means of tubes 99 and 100 of insulating material. The through bolts 98 have relatively large nuts 101 at their lowermost ends. These bolts extend below the nuts so that a plate 102 of non-magnetic material may be secured thereto by means of nuts 103. Plate 102 is provided with inverted channel members 104 secured thereto and placed between the lowermost pack of transformer laminations and the plate. The passageways provided by the inverted channels 104 have communication with each other as at 105 (see Fig. 2), and may be connected to conduits 106 so that cooling fluid may be passed therethrough to cool the bottom plate and protect it from the heated seam 3 of the pipe.

As shown in Fig. 5, the transformer laminations secured to the plates 69 and 70 may be covered with a layer of heat resistant insulating cement 107. A portion of this layer of cement may be confined between the lowermost packs 86 of laminations and the inverted channels 104. The core, such as shown in Fig. 5, is therefore protected from the pipe 2 and is also provided with means for cooling it so that it may operate with relatively high efficiency and without being affected by heat.

It will be apparent by reference to Fig. 5 that the internal core is so spaced from the inner surface of coil 47 that ample space is provided, as at 108, to permit free and unobstructed passage of the tube or pipe 2 through the heating station 6.

While the pipe 2 is passing through the heating station 6, the edges 7 and 8 of the seam are forced into contact with each other at a point near to outgoing end of the coil 47 by the seam adjusting rolls 50 and 51. These rolls as previously stated herein are mounted between coil sections $a$ and $b$ of coil 47 and are adjustably supported on the frame or yoke 57.

The rolls 50 are mounted on stub shafts 109 journalled in bearings 110 secured to a bearing housing 111, the bearings being insulated from the housing by insulation 110' in order to prevent the flow of electric current from the pipe 2 to the frame 57. The bearing housings 111 are slidably disposed within sleeves 112 attached to the yoke or support 57 as by rivets or other suitable means 113. The bearing housings 111 may be adjusted towards and away from the pipe 2 by means of screws 114 rotatably secured to the bearing housings as at 115. Screws 114 have screw thread engagement with the sleeves 112 as at 116 so that the rolls 50 may be adjusted to the proper position and locked in place.

Rolls 51 are carried by a structure identical to the structures employed for rolls 50, and are adjustable towards and from the tube or pipe 2 in the same manner. Therefore, the same reference characters as applied to the roll supporting and adjusting means for rolls 50 are applied to the roll supporting and adjusting means for rolls 51.

When the pipe or tube 2 leaves the heating station 6, the edges 7 and 8 of the open seam 3 are fused. During the heating of the metal the edges of the seam become semi-molten or plastic, and some of this metal is expelled or extruded. In order to complete the weld and to insure that the semi-molten or plastic metal will be so worked that a solid strong and substantial welded seam may be obtained, the expelled metal is trimmed before the pipe is passed through the rollstand 9 where it is operated upon by the welding rolls which complete the weld.

Before the pipe enters the rollstand 9, it passes over a roll 120 which is placed directly under the fused seam and is operable to give the necessary support for the pipe before it enters the rollstand 9. Roll 120 is adjustably mounted in a housing 121 secured to the frame of rollstand 9.

Before the heated seam 3 of the pipe passes between the welding rolls 14 and 16, the scavenging or cleaning apparatus, or instrumentality 17 (see Figs. 2 and 10) operates to scavenge and to clean or remove the excess metal, scale and/or slag that accumulates on the inside of the seam. The particular form employed, as shown in Fig. 2, comprises an air blast pipe 122 which is carried into the cantilever structure between rollstands 4 and 5 as at 123. The air blast pipe is then carried forward through the core and attached to a housing 124 in rollstand 9, in which the internal welding roll 14 is journalled. The air blast is directed against the seam at an angle thereto so that the slag, oxide or excess metal is blown away from the welding roll 14.

The outer surface of the seam to be welded may be operated upon in a similar manner to remove oxides, excess metal and/or slag. As shown in Figs. 2 and 10, a roll 126 is journalled in bearings carried by the supporting frame of the housing for rollstand 9. This roll is provided with a circumferential groove 126' in which an air blast pipe 127 may be located. The groove in roll 126 is disposed directly under the outer surface of the seam 3 so that the air blast pipe 127 located in the groove 126' may clean and scavenge the seam of excess metal, slag and/or oxide before the outer surface of the seam contacts with the bottom or external roll 16.

When the internal and external surfaces of the seam 3 have been prepared in the manner set forth above, the seam is in condition to be passed between the welding rolls 14 and 16.

Modified forms of mechanisms or instrumentalities which may be utilized in place of the instrumentality 17 and the roll 126 and air blast pipe 127 are illustrated in Figs. 11, 12 and 13 and will be described in a section following the description of rollstand 9.

Rollstand 9

The nature and construction of rollstand 9 may best be understood by referring to Figs. 1, 2 and 3. As there illustrated rollstand 9 comprises a frame 128 which is mounted on and secured to the bedplates 25 by means of bolts 129, the heads of which are anchored in the T-slots formed in the bedplates.

The bottom of frame 128 has a boxlike sleeve 131 in which is slidably disposed a housing 132 having bearings 133 in which a shaft 134 carrying the external welding roll 16 is mounted. The welding roll 16 may be provided with an anti-friction bearing, such as indicated by anti-friction rollers 135. The housing 132 may be braced and stiffened by a strut 136.

In order to provide for adjusting the roll 16, a screw 137 rotatably secured as at 138 to the housing 132 is provided. The screw 137 has screw thread engagement, as at 139, with a cap plate 140 which is bolted or otherwise secured to the underside of the frame 128. The external side rolls 11 and 12 are mounted in the frame 128 and are adjustable in the same manner as roll 16. Therefore, corresponding parts have been identified by similar reference characters. The rolls 11 and 12, however, differ from the welding roll 16 in that they are provided with beveled gear portions 142 and 143, respectively, that mesh with beveled gear portions 144 and 145, respectively, formed on the opposite ends of the top external roll 10.

Top roll 10 may be secured to a shaft 146 journalled in bearings 147 formed as an integral part of a housing 148 which is slidably disposed in a boxlike sleeve 149 formed as an integral part of frame 128.

Housing 148 is provided with an outwardly projecting arm or bracket 150 that extends through an opening or window 151 formed in the sleeve 149. The outer end of arm or bracket 150 terminates in a bearing 152 in which the shaft 146 is also journalled.

The bearing housing 148 may be raised or lowered within predetermined limits to permit adjustment of roll 10 by means of a screw 153 which is rotatably attached to the housing 148, as at 154, and has screw thread engagement with a cap plate 155 bolted or otherwise secured to the top of the sleeve 149, as indicated at 156. The shaft 146 may be connected to a motor for driving the top external roll 10. Since roll 10 is geared to the external side rolls 11 and 12, these rolls will turn in synchronism with each other and exert a pulling force on the pipe 2. The motor (not shown) which may be connected to shaft 146, it will be understood, should be synchronized with the motor or motors (not shown) connected to shafts 30 and 41 which are connected to the bottom and top rolls 20 and 21 of rollstand 4, so that the pulling forces exerted on the pipe 2 at rollstands 4 and 9 will be substantially equal to thereby advance the pipe at substantially the same speed.

The internal rolls 13 and 14 of rollstand 9 are carried by housings 158 and 124. The housings 158 and 124 may be secured to the plates 69 and 70 which carry the core proper for the induction coil 47. In Fig. 9 of the drawings, a top plan view of the housings 158 and 124 is shown illustrating the manner in which these housings are attached to the plates 69 and 70. Since the housings 158 and 124 are similar in construction, only housing 158 need be described, since it is shown clearly in Fig. 9.

Housing 158 is split at its rear end to accommodate the vertical plate 69. The housing may be insulated from the plate 69 by strips 160 of suitable insulating material, and secured to the vertical plate 69 by means of a through bolt 161 which may be insulated from the housing and the plate by a tube or sleeve 162 of insulating material. The housing 158 may be secured to the horizontal plates 70 by means of flanges 163, formed on the opposite sides of the housing, and bolts 164. The bolts 164 may be insulated from the housing and the plates 70 by tubes of insulation 165. As shown in Fig. 2, the housing 158 is insulated from plates 70 by strips of insulation 166.

Roll 13 is disposed in a cavity or well 167 formed in housing 158 and is journalled therein on a stub shaft 168 extending through the side walls thereof.

In order to provide for adjustment of the roll 13, the stub shaft 168 has a cam 169 attached thereto which is provided with a series of ratchet teeth 170. The roll 13 may be locked in any adjusted position by means of a pawl pivotally mounted on a screw or bolt 172 attached to the housing 158.

As stated above, the housing 124 is similar to housing 158 except that its position is the reverse of housing 158 and it is attached to the vertical plate 69 and the horizontal plates 70 in the same manner.

In practice, the internal welding roll 14 may become hot or heated to injurious temperatures. In order to avoid such temperatures, the roll may be cooled by causing a stream of water, for example, to circulate through the bearings thereof. The stream of cooling fluid may be conveyed through a pipe or conduit 174 (see Figs. 2, 6, and 7).

In Fig. 11 of the drawings, a device 175 for trimming the inner surface of seam 3 is shown. This device may be attached to the plates 69 and 70 and may replace the housing 124 and the welding roll 14 illustrated in the partial sectional view of Fig. 10. A device 176 disposed adjacent to the external welding roll 16, which may be substituted for the roll 126 and the air blast pipe 127 of Fig. 10, is also illustrated. Device 176 may be utilized for trimming the outer surface of seam 3.

The device 175 comprises a shoe casting 177 having an internal wall or surface 178 that slopes towards a point on the fused seam 3 before it enters the rollstand 9. In order that the excess metal, scale, slag and/or oxide may be removed from the inner surface of the fused seam, a tool 179 may be secured to the sloping wall 178 (see Figs. 11 and 13). This tool may be secured to the sloping walls by means of a screw 180. Tool 179 is provided with a cutting edge or point 181 that operates to trim or remove a certain portion of the excess metal, scale, oxide and/or slag which is formed at the seam while the pipe 2 is passing through the heating station 6. As shown in Figs. 11 and 12, the shoe is located directly above the welding roll 16 and cooperates with said roll to iron, squeeze or work the fused seam so that the weld is complete after the seam has passed between the shoe casting and the welding roll. The excess metal, scale, oxide and/or slag removed by the tool 179 may be scavenged by means of the blast pipe 122 shown in Figs. 1 and 10.

As illustrated in Figs. 11 and 13, the shoe casting 177 is made hollow, as at 182 in order that cooling fluid may be circulated therethrough so as to prevent the shoe casting from being heated to injurious temperatures. The cooling fluid may be conveyed to the shoe casting by conduits 174 shown in Figs. 2, 5, 6 and 7.

The device 176 comprises a support 183 that may be secured to a cross-plate 184 attached to the bedplates 25 of the machine. Support 183 is provided with a sleeve 185 for receiving the shank of a trimming tool 186 having a cutting edge or point 187 so placed that it will trim the excess metal, scale, oxide and/or slag formed at the outer surface of the fused seam 3.

The portion of the seam 3 removed by the cutting edge 187 of tool 186 may be scavenged by means of a blast pipe or conduit 188 having a discharge nozzle 189 directly behind the cutting edge 187. The blast of air discharging from the nozzle 189 may be utilized not only to scavenge, but also to cool the tool 186.

In Fig. 12 a partial view of the apparatus shown in Fig. 11 is illustrated. In this figure the welding roll 16 is removed so that a clear view of the support 183, the cutting tool 186 and the blast pipe 188 may be had. As shown in Fig. 12, the nozzle 189 is relatively wide so that a relatively wide stream of air may be blown over the cutting edge of the tool to thereby insure complete and efficient scavenging of the material removed from the external surface of the fused seam 3.

In Fig. 14 of the drawings, a pipe 2' is shown having an open seam 3'. The adjacent edges of the pipe at the seam 3' may be enlarged or upset as indicated at 7' and 8' in order to provide a relatively large area of contact between the adjacent edges of the open seam while the pipe is being fed through the heating station 6 of the machine. It has been found that by upsetting the edges of the open seam in the manner illustrated in Fig. 14, a larger area of contact is obtained and this materially increases the rate at which the open seam of the pipe may be heated as it passes through the heating station. Open seam pipe having upset or enlarged adjacent edges at the open seam may, therefore, be welded at a higher rate than where the seam is not enlarged or where the edges of the seam are reduced in thickness. In case the edges of the open seam are prepared in the manner indicated in Fig. 14, it will be understood that the rolls of the various rollstands will be so modified as to accommodate the enlarged edges of the seam 3'.

Operation

The operation of the machine or apparatus disclosed in the drawings may best be understood by reference to Figs. 2 and 15. An open seam pipe to be welded is fed into rollstand 4. The power driven rolls 20 and 21 of this rollstand will feed the pipe longitudinally of the machine into rollstand 5 which is provided with idle rolls operating upon the external surface of the pipe. While the pipe is being fed from rollstand 4 to rollstand 5, the seam is held open by means of fins 24 and 46 formed on the bottom rolls 20 and 43 of these respective rollstands. Also these fins prevent the pipe from turning about its longitudinal axis.

When the pipe leaves rollstand 5, it is fed through heating station 6. The induction coil 47 of this station which is composed of sections $a$, $b$ and $c$ is connected to a suitable source of alternating current. The alternating electromagnetic field produced by the coil causes alternating current voltage to be induced in that section of the pipe 2 confined within the length of the induction coil thereby causing the edges 7 and 8 to become heated to welding temperature when they are forced into contact with each other. While the pipe passes through the heating station 6, the edges 7 and 8 of the seam 3 are squeezed together or forced towards each other by means of seam adjusting rolls 50 and 51 located between coil sections $a$ and $b$. The effect of the seam adjusting rolls upon the pipe is to cause the adjacent edges 7 and 8 of the open seam to become heated by a combination of resistance and arc heating, and to initiate fusing of the edges.

In Fig. 15 of the drawings, the open seam of the pipe and the manner in which it is manipulated as the pipe passes through the machine is more clearly shown. As there illustrated, the pipe seam 3 is held open by the fins 24 and 46 of rolls 20 and 43 in rollstands 4 and 5, respectively. Seam 3 is thus held open throughout a major portion of coil 47. It is closed by the seam adjusting rolls 50 and 51 at a point D, near to the outgoing end of the coil. The seam when so closed at point D is substantially of a V-shape from that point back to the rollstand 4, and beyond to the end of the pipe at the right of rollstand 4.

When the seam 3 is closed at point D, the edges 7 and 8 are brought into contact thereby providing a path for current to flow. The amount of current flowing across the seam at point D is dependent upon the voltage induced in that portion or section of the pipe located within, or linking with the magnetic field developed by coil 47. Since the current which flows is concentrated at point D, or at the base of the V-shaped seam, the edges 7 and 8 will be heated rapidly to welding or fusing temperature.

With respect to the coil 47 and the seam adjusting rolls 50 and 51, point D is fixed. Since pipe 2 is fed continuously through the machine, the open seam 3 is closed continuously and successively from one end of the pipe to the other. While the seam is being thus closed, the edges 7 and 8 are being heated to welding temperature at the point of closure.

The point of closure travels from one end of the pipe to the other during the movement of the pipe through the machine. The result obtained, so far as the heating of the seam edges 7 and 8 is concerned, would be the same as if the pipe were held stationary and seam 3 closed progressively from one end of the pipe to the other. At the same time, the base of the gradually shortening V-shaped seam is being heated to welding temperature.

Stated in another way, suppose the open seam 3 should be closed at one end of the pipe, a seam of V-shape would be formed. Suppose electric currents were passed across the seam edges at the point of closure, at the base of the V, heating the edges to welding temperature at this point, and that the seam edges were thus gradually, continuously and successively brought together and heated by electric currents at the point of contact, until the seam is closed from end to end. In this case a traveling weld is obtained starting at one end of the pipe and stopping at the opposite end. By so gradually, successively and continuously closing the seam and simultaneously heating the seam at the point of closure by currents of electricity, as that point travels from one end of the pipe to the other, the seam edges are thoroughly, uniformly and intensely heated to welding temperature throughout the full length of the pipe.

It will be apparent from inspection of Figs. 2 and 15 that after the seam 3 is closed at the point D and heated to welding temperature, the seam edges 7 and 8 are held in contact by the external rolls 10, 11 and 12 of rollstand 9. Since the seam is thus held closed, some of the current induced in the pipe will flow across the closed seam to the left of the point D as viewed from Fig. 15. So much of the seam which is closed to the left of point D and traversed by electric current will be heated by resistance heating. When contact between the seam edges 7 and 8 is made as at point D, and current is caused to flow thereacross, an arc will tend to form for a short distance to the right of point D so that a portion of the seam edges adjacent to the point D will be heated by arc heating or by the heat developed by the arc so drawn.

It will be understood that as the pipe passes through the heating station 6, the edges 7 and 8 of the pipe make and break contact with each other so that while the edges are in contact resistance heating takes place, and when the edges separate from each other an arc is drawn. During the period of contact, the seam is heated by resistance heating and when the edges are separated, the arc which is drawn becomes effective to heat the seam by arc heating. The heating of the seam as it passes through the heating station 6, is what may be called local heating as only a relatively narrow portion of the pipe is heated and that portion is confined to the edges of the seam 3 of the pipe. It, therefore, follows that the heat energy is applied locally, so to speak, and at the point where it is desired. Therefore, since the body of the pipe is not appreciably heated, heat energy is not wasted. As the pipe leaves the heating station, the fused seam is trimmed on its inner and outer surfaces in the manner hereinbefore described so that when the seam passes through the rollstand 9, a smooth, strong and efficient weld is obtained between edges 7 and 8.

The operation and/or method of welding open seam pipe, such as the pipe 2, it will be understood, is continuous. Pipes varying from 6" to 30" in diameter may be rapidly welded at a rate of from 20 to 60 feet per minute or more depending upon the size of the pipe and its wall thickness.

The machine shown in the drawings may be utilized to weld pipes of smaller diameter than pipe 2 by substituting a core of smaller dimensions for the one illustrated in connection with the coil 47 so that such smaller pipe may be passed over it, that is, the core must fit within the inside surface of the pipe.

Where pipe of small diameter is to be welded, the frequency of the alternating current impressed on the induction coil may be varied until the proper frequency is selected which will produce efficient heating in the pipe. The general rule is that where pipe of smaller diameter is to be welded, the frequency of the alternating current must be higher than for pipes of larger diameter. For the larger size pipe ordinary commercial alternating current frequency may be employed, but for the smaller diameters of pipe, a higher frequency is required for efficient heating.

While various modifications and changes may be made in the machine or apparatus herein disclosed without departing from the spirit and the scope of the invention, it is to be understood that only such limitations shall be placed on the invention as are imposed by the prior art and the appended claims.

What I claim as new and desire to secure by Letters Patent is:

1. A core for an induction coil adapted for mounting as a cantilever within the coil comprising a vertical plate, and two horizontally extending plates secured one on each side to said vertical plate, sheets of magnetic material disposed on each side of the vertical plate and above and below the horizontal plates and means for securing said sheets in place and in fixed relation to said vertical and horizontal plates.

2. In a machine for making welded seamless pipe, conduit and the like, in combination with a power driven roll stand for feeding open seam pipe or conduit, a roll stand through which said pipe is fed, means for heating the open seam of said pipe or conduit by electromagnetic induction to welding or fusing temperature as it leaves said roll stand, means for scavenging the heated or fused seam as the pipe leaves the heating means, and a power driven roll stand through which the pipe passes for rolling and crushing the heated scavenged seam to complete the welding thereof.

3. In a machine for making welded seamless pipe, conduit and the like, in combination with a power driven roll stand for feeding open seam pipe or conduit, an idle roll stand through which said pipe is fed, means for heating the open seam of said pipe or conduit by electromagnetic induction to welding or fusing temperature as it leaves the idle roll stand, means for trimming the heated seam as it leaves the heating means, and a power driven roll stand through which the pipe passes for rolling and crushing the heated seam to complete the welding thereof.

4. In combination with an alternating current coil having an internal core mounted in spaced relation thereto, of means for feeding open seam pipe through the space between the coil and the core, means for maintaining the seam edges of the pipe in spaced relation for a distance extending from a fixed point with reference to the outgoing end of the coil to the trailing end of the pipe, and means disposed between the ends of the coil for progressively forcing the edges of the open seam into contact with each other at said fixed point to effect heating of said edges to welding temperature at said point of closure.

5. In combination with an alternating current coil having an internal core mounted in spaced relation thereto, of means for feeding open seam pipe through the space between the coil and core, means disposed between the ends of the coil for progressively forcing the edges of the open seam into contact with each other at a fixed point beyond said edge forcing means with reference to the direction of travel of the pipe, and means for scavenging the heated seam as it leaves said coil.

6. In combination with an alternating current coil having an internal core mounted in spaced relation thereto, of means for feeding open seam pipe through the space between the coil and the core, means disposed between the ends of the coil for forcing the edges of the open seam into contact with each other, means for trimming the heated seam as it leaves said coil, and means for rolling the trimmed seam to thereby complete the welding of said seam.

7. The method of welding open seam pipe that consists in progressively applying pressure to successive portions of the pipe so as to progressively close the seam from one end of the pipe to the other, subjecting successive portions of said pipe to the effect of an electro-magnetic inductive means whereby currents of electricity are caused to flow across the point of contact of the seam edges as the seam is progressively closed, whereby the seam edges are progressively heated to welding or fusing temperature from one end of the pipe to the other, and then in rolling the fused seam edges to thereby weld them together.

8. In combination with an alternating current coil having an internal core mounted in spaced relation thereto, of means for feeding open seam pipe through the space between the coil and the core, means for forcing the edges of the open seam into contact at a point adjacent the outgoing end of the coil, means for directing an air blast against the contacting seam edges, and means for rolling the air blasted edges to thereby complete the weld.

9. In combination with an alternating current coil having an internal core mounted in spaced relation thereto, of means for feeding open seam pipe through the space between the coil and the core, means for forcing the edges of the open seam into contact at a point adjacent the outgoing end of the coil, means for directing a blast of oxygen laden medium against the contacting edges, and means for rolling the blasted edges to complete the weld.

10. In a welding apparatus for the welding of substantially tubular material having the edges thereof in adjacent relationship to define the line of weld, means cooperating with the material for inducing a current flow therein, and means for effecting a greater heat removal from said first mentioned means adjacent the line of weld than adjacent the remaining portions thereof.

11. In a welding apparatus for effecting a weld between the edges of preformed substantially tubular material, a coil for inducing heating current in the material and mounting means for said coil providing a greater distance from said material and said coil adjacent said edges than adjacent the remainder of the periphery of said material.

12. An inductive pipe-welding machine having a frame and spaced sets of leading guide and trailing pinch rolls in said frame for supporting and moving a pipe blank to be welded through said frame, a laminated core structure and an energizing coil both located coaxially with the pipe blank and the sets of rolls and ahead of said pinch rolls, the coil being curved away from the pipe blank adjacent the line of the seam thereof, and a cooling element located between said coil and the pipe blank adjacent said curved away portion of said coil.

13. An inductive pipe-welding device having a frame and spaced sets of leading guide and trailing pinch rolls in said frame for supporting and moving a pipe blank to be welded through said frame, a laminated core structure and an energizing coil embracing the same both located coaxially with and in inductive relation to the pipe blank traversing said frame and ahead of said pinch rolls, the coil being curved away from the pipe blank adjacent the line of seam thereof, and a fluid cooling means including a metallic element for rapidly conducting away the heat generated at the seam of such pipe blank located between such pipe blank being welded and the curved away portion of said coil.

14. In a machine for inductively welding initially open pipe blanks, a frame, sets of guide and pinch rolls located on said frame in a predetermined sequence relative to the direction of movement of a pipe blank to be welded, an energizing coil located ahead of the pinch rolls in operative relation to such pipe blank, the sets of guide and pinch rolls cooperating to advance the pipe blank with the seam edges lowermost and to effect engagement of the edges of the pipe blank in such fashion that said edges form an elongated V-gap with the apex of said gap located at a point adjacent said pinch rolls and the bottom portion of said energizing coil.

15. In a machine for inductively welding initially open pipe-blanks, a frame, and an energizing coil supported by said frame in inductive-energy-transferring relation to a pipe-blank to be welded, a set of pinch rolls on said frame located beyond said coil in the direction of travel of said pipe-blank to force the edges of the pipe into close operative engagement to effect a weld, and a set of guide rolls for the pipe-blank located ahead of the pinch rolls, and adjusted to permit the edges of the pipe-blank to remain wholly out of engagement with each other until within a relatively short distance of said pinch rolls.

16. An inductive pipe welding device including a frame, a set of pinch rolls at the trailing end thereof for supporting and moving an initially open pipe-blank to be welded, a core, and an energizing coil embracing said core and disposed ahead of the pinch rolls in inductive relation to such pipe-blank, and a set of guide rolls engaging such pipe-blank and located ahead of said core and coil, said guide rolls being positioned to engage the pipe-blank and to maintain the edges of the pipe-blank wholly separated while passing therethrough, said pinch rolls forcing said such edges into contacting relationship at a point adjacent the trailing end of said coil.

17. A machine for longitudinally welding an initially open pipe-blank comprising, in combination, a frame, a core and an energizing coil embracing said core for inducing current into a pipe-blank to be welded, support means for mounting the core within the pipe-blank, the support means being carried by the frame and positioned in the longitudinal opening in the pipe-blank so as to guide the pipe-blank over the core with the seam below the core, and pinch and guide rolls mounted on the frame, respectively at the trailing and leading end of said coil and core for supporting and moving such pipe-blank, said pinch and guide rolls cooperating with the core support means to hold the pipe seam wholly open as it passes through the guide rolls and to close the seam edges of such pipe-blank in such fashion that the pipe edges form an elongated V-gap with the gap located adjacent to and in advance of the pinch rolls.

18. An inductive pipe-welding device having spaced sets of leading guide and trailing pinch rolls for supporting and moving a pipe-blank to be welded through the device, a laminated core and an energizing coil embracing said core, both located between and coaxially of said sets of rolls, said coil being curved away from such pipe-blank adjacent the line of the seam therein, and a cooling element located between the pipe-blank seam and the curved away portion of the coil.

19. An inductive pipe-welding device having spaced sets of leading guide and trailing pinch rolls for supporting and moving a pipe-blank to be welded, a laminated core and an energizing coil embracing said core, both located between and coaxially of said sets of rolls, said coil being curved away from such blank adjacent the line of seam thereof, and a cooling element located between such seam and said core.

20. An inductive pipe-welding machine having a leading set of guide rolls and a trailing set of pinch rolls for supporting and moving an initially open pipe-blank to be welded through the machine, means for guiding and holding the seam edges of said pipe-blank in spaced relation while passing through the guide rolls, a laminated core within such blank and between said roll sets, a coil embracing said core and magnetically linking both the core and pipe blank, and means cooperating with the guide and pinch rolls for causing the edges of the blank seam to close at a point near the pinch rolls but remote from the guide rolls.

21. A machine for continuously and progressively welding the seam of a pipe-blank, comprising means for moving said blank including sets of leading guide and trailing pinch rolls and means for holding the seam edges of such blank in fixed spaced relation to each other in advance of and through said guide rolls to a point adjacent said pinch rolls, and electro-magnetic inductive means between said sets of rolls and coaxially of such blank for inducing current in such blank which flows across the seam edges thereof at the point of closure adjacent said pinch rolls, and electro-magnetic inductive means including a magnetizable core and an energizing coil embracing the same.

22. A method of welding the seam of a pipe-blank, which consists in progressively subjecting successive portions of such blank to the effect of an electro-magnetic inductive means while holding the seam thereof open and on the lower side of such blank, and in then progressively closing such seam so as to hold portions thereof open until reaching the point of final closure thereof.

23. An electromagnetic heating device for heating metallic objects to welding temperature by induction, comprising a core of magnetizable material, and a coil disposed about said core for inducing welding current in said objects progressively as they move past the core, said coil being spaced farther from the bottoms of the objects passing the core than from the other portions thereof in order to provide a relatively large clearance space between the coil and the surface of the material being heated to welding temperature.

COMER D. HAZEN.